US006962736B1

(12) United States Patent
Haapaniemi et al.

(10) Patent No.: US 6,962,736 B1
(45) Date of Patent: Nov. 8, 2005

(54) STRUCTURAL PLY OF A PAPERBOARD CORE, A PAPERBOARD CORE MADE THEREOF, AND A METHOD OF IMPROVING THE STIFFNESS OF A PAPERBOARD CORE

(75) Inventors: Jukka Haapaniemi, Tavastila (FI); Markku Jarvinen, Huutjarvi (FI)

(73) Assignee: Sonoco-Alcore Oy, Karhula (FI)

( * ) Notice: Subject to any disclaimer, the term of this patent is extended or adjusted under 35 U.S.C. 154(b) by 658 days.

(21) Appl. No.: 09/367,108

(22) PCT Filed: Jan. 23, 1998

(86) PCT No.: PCT/FI98/00061

§ 371 (c)(1),
(2), (4) Date: Aug. 10, 1999

(87) PCT Pub. No.: WO98/35825

PCT Pub. Date: Aug. 20, 1998

(30) Foreign Application Priority Data

Feb. 14, 1997 (FI) .................................. 970081 U
Feb. 14, 1997 (FI) ...................................... 970646

(51) Int. Cl.[7] ............................................... B32B 29/00
(52) U.S. Cl. .................. 428/34.2; 428/34.1; 428/34.6; 428/906
(58) Field of Search ............................ 428/34.1, 34.2, 428/34.6, 906

(56) References Cited

U.S. PATENT DOCUMENTS

| | | | |
|---|---|---|---|
| 4,675,079 A | 6/1987 | Webster | 162/360.1 |
| 4,729,175 A * | 3/1988 | Beard et al. | 34/1 |
| 4,874,469 A | 10/1989 | Pulkowski et al. | 162/359 |
| 5,167,994 A | 12/1992 | Paulson | 428/34.2 |
| 5,393,582 A * | 2/1995 | Wang et al. | 242/118.32 |
| 5,505,395 A | 4/1996 | Qiu et al. | 242/118.32 |

FOREIGN PATENT DOCUMENTS

| | | |
|---|---|---|
| EP | 0627306 | 12/1994 |
| EP | 0631963 | 1/1995 |
| WO | WO 9519930 | 7/1995 |

OTHER PUBLICATIONS

Lehtinen et al, "Tampella's Condebelt Project", Ahlstrom brochure, pp. 24 and 25.
Gunderson, "An overview of press-drying, impulse-drying, and Condebelt-drying concepts", Paper and Timber, vol. 74/No. 5, 1992, pp. 412-418.
"Enso Invests in new technology", Paper and Timber, vol. 77, No. 3, 1999, p. 69.

* cited by examiner

*Primary Examiner*—Harold Pyon
*Assistant Examiner*—Marc Patterson
(74) *Attorney, Agent, or Firm*—Nixon & Vanderhye, P.C.

(57) ABSTRACT

A structural ply of a spiral paperboard core has an elasticity modulus E in the cross machine direction (CD) higher than 4500 Mpa, and an elasticity modulus E in the machine direction (MD) higher than 7500 MPa (N/mm2). Such paperboard cores may be manufactured by using, either solely or partly, these structural plies, the paperboard for making up such structural plies having been manufactured by press drying. Paperboard based on the press drying method can be manufactured, e.g., with a board machine employing the Condebelt process. The cores may be used as yarn carriers and as tubes for thin films and foils, which may be wound onto and unwound from the cores at a speed of at least about 200 meters/minute.

6 Claims, 3 Drawing Sheets

STRUCTURAL PLY OF A PAPERBOARD CORE, A PAPERBOARD CORE MADE THEREOF, AND A METHOD OF IMPROVING THE STIFFNESS OF A PAPERBOARD CORE

CROSS REFERENCE TO RELATED APPLICATION

This application is a U.S. National Phase of PCT/FI/98/00061, the disclosure of which is incorporated by reference herein.

BACKGROUND AND SUMMARY OF THE INVENTION

The present invention relates to a structural ply of a paperboard core, and particularly made by press drying in a machine having machine and cross machine directions. The invention also relates to a spiral core comprising such a structural ply. Further, it relates to a method of improving the stiffness of a spiral paperboard core.

A spiral paperboard core is made up of a plurality of superimposed plies of paperboard by winding, gluing, and drying such.

Webs produced in the paper, film, and textile industries are usually reeled on cores for rolls. Cores made from paperboard, especially spiral cores are manufactured by glueing plies of paperboard one on top of the other and by winding them spirally in a special spiral machine. The width, thickness, and number of paperboard plies needed to form a core vary depending on the dimensions and strength requirements of the core to be manufactured. Typically, the ply width is 50 to 250 mm (in special cases about 500 mm), ply thickness about 0.2 to 1.2 mm, and the number of plies about 3 to 30 (in special cases about 50). The strength of a paperboard ply varies to comply with the strength requirement of the core. As a general rule, increasing the strength of a paperboard ply also increases its price. Generally speaking, it is therefore true to say that the stronger the core, the more expensive it is.

Paper reels used on printing presses are formed on a winding core. Almost always this winding core is a spirally wound paperboard core. In high efficiency printing presses, there is effected a so-called flying reel change towards the end of unwinding, i.e., the web for a new paper reel is joined at full speed to the web which has been nearly unwound. A sufficiently firm and stiff core is a highly essential factor for the flying reel change to be successful.

Printing presses typically use cores of two sizes. The most usual core size has the inside diameter of 76 mm and the wall thickness of 13 or 15 mm. Today, the widest and fastest printing presses use cores with the inside diameter of 150 mm and the wall thickness of 13 mm. At the reel change, the minimum thickness of paper on the core is about 3 to 8 mm. If the core is not stiff enough, even much more paper has to be left thereon. Paperboard cores used at printing presses are typical cores of the paper industry, i.e., they are thick-walled, the wall thickness H being 10 mm or more and the inside diameter of the core being over 70 mm. Cores for the paper industry have to be thick-walled, i.e., the wall thickness has to be about 10 mm or more, e.g., in order to enable them to be clamped by chucks (chuck expansion) and in order to enable formation of a nip between the core surface and a backing roll, for the paper web to be reeled. Especially, the geometry of slitter-winders calls for a sufficient wall thickness of the cores, which is in practice 10 mm or more.

Typically, such paper industry cores are used if the winding/unwinding speeds are at least about 200 m/min (=3.3 m/s).

If and, in practical circumstances, when the web speed of the printing press is not reduced for the reel change and when the size, i.e., the diameter of the paper reel diminishes during unwinding thereof, the speed of rotation of the diminishing reel increases to a considerably high rate.

The tendency has been towards wider and wider as well as faster and faster printing presses. Transferring to wide printing presses, i.e., those with long cores, and high running speeds, may result in that the rest reel, i.e., the paperboard core+the paper web to be left thereon, will get into its natural vibration range during the reel change, consequently shaking. This may lead to a costly web break or even to an explosion of the rest reel into pieces, thereby causing an extreme safety risk.

Such a situation is typical to wide and fast rotogravure presses. Rotogravure printing is a highly efficient printing mode, utilizing wide and fast printing presses and big reels. Also the fastest and widest catalogue presses may end up in a similar situation. With catalogue presses, this is partly also due to the fact that the stiffness factor of the paper roll supporting system, dependent on the chucks, is usually weaker than in high efficiency rotogravure presses.

In rotogravure presses, where the stability problem in unwinding is current, conditions are typically as follows.

With 2.45 m wide printing presses, cores with inside diameter of 76 mm are used. In special cases, when usually a larger amount of produced paper is required, printing presses of at most 2.65 m in width can be used together with cores having the inside diameter of 76 mm. If the rest reel were run near to the usual minimum amount of residual paper with these running parameters, the safety factor as to getting into the vibration range would be absolutely too small. In order that safe handling of the rest reel can be ensured, the amount of residual paper has to be grown from the earlier minimum of about 3–8 mm to as much as 15 mm. This naturally causes a great economic loss in form of wasted paper. The web speed at printing is here about 14 m/s.

When the inside diameter of the core is 150 mm, the printing press widths usually exceed the above values (cores having the inside diameter of 150 mm are, however, applicable with the above printing press widths). The printing press widths are typically 3.08 m, 3.18 m, or 3.28 m. The printing speeds with these machines are the same as mentioned above.

The new generation of rotogravure presses will again be wider and faster than before, estimates of a combination of width and web speed of 3.68 m and 16 m/s or alternatively 3.08 m and 20 m/s or 3.18 m and 25 m/s have been presented. By early 1997, however, such new generation rotogravure presses have not yet been manufactured.

In the widest printing presses, which require a wider/faster web, the inside diameter of the core has been changed to 150 mm in order to solve the vibration problem. So far, this arrangement has functioned well. Now, the same problem as with earlier machines, until transferring to 150 mm cores, will be faced again with the running parameters of the new machines being designed. In other words, the risky range of natural vibration of the rest reel will be entered again.

For this reason, the stiffness of the core has to be grown in one way or another, in order that an increase in the inside diameter of the core could be avoided. The arrangement of increasing the inside diameter of the core has been considered a most undesirable solution in the production chain.

As discussed above, a spiral paperboard core is manufactured by winding narrow paperboard plies spirally around a mandrel. The paperboard of which the plies to be wound are cut off has been manufactured with a board machine. The selection of the interior and exterior plies of the core is usually (not always) based on other grounds than the selection of the structural plies. Therefore, the strength properties of the interior and exterior plies are not often the same as those of other plies of the core. These other plies, usually located between the outer plies of the core, are called structural plies because their properties determine the final strength and quality class and other properties of the core. In those cases in which the end use of the core does not set any special demands on the exterior or interior plies (or under-exterior plies attached to them), the entire core may be constructed of these above-identified structural plies. In manufacturing of paperboard, it is an ambition to get its strength properties as homogeneous as possible. So-called squareness is the term used in this context, and its theoretical low limit, which is 1, is striven for. The longitudinal (=machine direction) strength of square paperboard as well as its elasticity modulus are the same as its corresponding values in the cross machine direction. In board machine arrangements of prior art, paperboard is, however, essentially stronger in the machine direction (typically 1.6–2.7 times stronger) than in the cross machine direction. This applies to the elasticity modulus of paperboard as well. As to the core stiffness, the axial stiffness factor of the core is determining. Due to the structure of a spirally wound core, the stiffness factor of paperboard in the machine direction (bigger) becomes more or less circumferential and the stiffness factor of paperboard in the cross machine direction (smaller) more or less axial.

By optimizing the ratio of paperboard in the machine direction to paperboard in the cross machine direction and by adjusting the structure of a spirally wound core (winding angles), it is possible to influence on the situation to some extent. However, with conventional board machines and conventional spiral machines, the chances are quite limited, and not adequate for solving the problem.

Rotogravure cores are divided into two categories in accordance with their strength requirement, i.e., into a lower and a higher strength class. The elasticity moduli of conventional rotogravure cores of the lower strength class are on the level of 3300 to 4000 MPa. The elasticity moduli of commercial grades made from conventional materials but belonging to the higher strength class are on the level of 4200 to 4800 MPa. With special measures, these values can be marginally exceeded. The reel weights and printing press widths in rotogravure presses determine from which of the two strength classes paperboard cores are selected.

The levels of elasticity moduli of the raw materials for the core are dependent on the raw material for the paperboard ply to be used, on the manufacturing method, and on the orientation ratio (strength parameters of the ratio of paperboard in the machine direction to paperboard in the cross machine direction). The elasticity moduli of typical paperboard materials for rotogravure cores, which have expedient squareness, are about 6000 MPa in the machine direction and about 3000 MPa in the cross machine direction in the lower strength class. The corresponding values for the higher strength class materials are about 6500 to 7500 MPa in the machine direction and about 3500 to 4000 MPa in the cross machine direction.

A prior art patent document U.S. Pat. No. 5,505,395 describes a typical prior art core for the higher strength class, used e.g. for rotogravure cores. The elasticity moduli of the plies in one solution, described in this patent document are about 10900 Mpa in the machine direction and about 3660 Mpa in the cross machine direction (Table I).

A prior art patent document U.S. Pat. No. 5,167,994 describes a reusable, dimensionally stable, lightweight, multi-layer tubular core. A water barrier is embedded between the outermost layer or layers and the central or intermediate layers of fibrous material. Similarily, a water barrier is embedded between the innermost layer or layers of fibrous material and the central or intermediate layers. The vapour barrier layers prevent the fibrous materials used in constructing primarily intermediate layers of the tube from absorbing moisture from atmosphere. This minimizes changes in the dimensions of the tube with changes in ambient humidity.

A prior art patent document U.S. Pat. No. 4,675,079 describes an improved multi-nip suction press with a four roller closed train. This document represents one of the prior art drying apparatuses.

An object of the present invention is to provide a structural ply of a novel type and improved applicability for a spiral paperboard core. Another object of the present invention is to provide a spiral paperboard core comprising at least one such structural ply and having improved strength properties. As the structural plies in accordance of the invention are superior to prior art structural plies, it is worthwhile optimizing their share of the core wall thickness and location in the core wall. As discussed above, the quality class of the raw materials for cores and consequently also the quality class of cores goes hand in hand with the price paid/received for them.

A still further object of the present invention is to solve problems related to presently used spiral cores discussed above, and to provide a spiral paperboard core, which meets e.g. the strength requirements of cores, set by the running parameters of new printing presses. The arrangements according to the present invention are also applicable to other places where especially high stiffness is required.

These objects are achieved with the arrangements in accordance with the accompanying claims.

Based on tests we have performed, we have found that sufficiently strong cores are provided for printing presses of the new generation, and cores stronger than before are provided for existing printing presses when, in accordance with the present invention, the cross machine direction (CD) elasticity modulus E of a structural ply of a spiral paperboard core is substantially higher than 4500 MPa. Further, the machine direction (MD) elasticity modulus E of the structural ply is preferably substantially higher than 7500 MPa.

These new type paperboard cores of the present invention can be manufactured by using, either solely or partly, structural plies in accordance with the invention. The paperboard for these structural plies is manufactured, e.g., by what is called a press drying method.

Paperboard based on press drying can be manufactured by a board machine, utilizing a prior art process called Condebelt. The inventor of this Condebelt process is Jukka Lehtinen of Tampella LTd, Finland. There is at present (1997) only one machine (made by Valmet LTd) in the world utilizing this Condebelt press drying process; Pankakoski Boards Oy Ltd, a member of the Enso Group (Paperi ja Puu—Paper and Timber VOL 77/NO 3/1995, p. 69). Structural plies manufactured with other appropriate methods and meeting the strength requirements according to the invention can also be utilized in constructing a paperboard core. In Dennis Gunderson's review article in "Paperi ja puu—Paper and Timber" Vol. 74/NO 5/1992, pp. 412–418 on p. 415

Donald Sparkes has defined press drying as being "any process which simultaneously applies heat and perpendicular pressure to the moist paper in excess of that applied by the combination of a dryer cylinder and fabric, but excluding the commercially well established combination of Yankee cylinder and pressure rolls". Only one of the sixteen developments reviewed by Sparkes is directed toward reproducing the conditions of static press drying; that is Lehtine's Condebelt design.

As press drying is an efficient process, it is possible to increase the elasticity moduli of structural plies by that method, and the machine direction elasticity modulus of the above-mentioned structural plies of a rotogravure core of the lower strength class can be raised to a level of at least about 7500–10000 MPa, and with winding angles of 15 to 35° which are usually used, the elasticity modulus in the cross machine direction, which is very important, can be raised to a level of about 4500–5000 MPa. For example, the test result showing the elasticity modulus of 4800 MPa in the cross machine direction represents a fairly high standard in this strength class. As to cores of the higher strength level in accordance with the present invention, they correspond to the higher or better strength level of rotogravure cores. When structural plies according to the invention and manufactured from the better quality press drying material (e.g., with the so-called Condebelt method) are used, the machine direction elasticity modulus can be raised to a level of about 10000–12000 MPa, and the elasticity modulus in the cross machine direction to a level of about 5000–8000 MPa. Test results showing, e.g., the levels of structural ply elasticity moduli of 5500 MPa and 6500 MPa in the cross machine direction represent a fairly high standard in this strength class.

Use of the new structural ply as described in the invention meets the stiffness requirement of cores to be used in rotogravure presses of the new generation without a need to change the core structure in any other way except for the raw material.

Thus, the elasticity modulus of the cores of the presently used lower strength class cores can be raised to a level of at least about 5000–6000 MPa by utilizing arrangements of the invention. For example, a test result showing the level of elasticity modulus of at least about 5500 MPa represents a fairly high standard in this strength class. The elasticity modulus of the higher strength class cores may be raised to a level of at least about 6000–6500–7000 MPa and even higher, which is adequate for meeting the requirements set by the new generation of rotogravure presses.

As can be seen, the values of the elasticity modulus of cores made up of paperboard plies according to the invention well suffice for the strength requirements of the above-mentioned rotogravure presses.

Use of paperboard cores according to the invention is not exclusively intended to the exemplified paperboard cores of the new generation of rotogravure presses. They may be used in every place where a higher stiffness is required of cores than usually. Such especially stiff cores are needed, for example, in rolling up carpets. Such carpet cores are subjected to especially long-lasting stresses because the carpet to be rolled around the core does not support the core, unlike e.g. in reeling paper. The inside diameter of the core can naturally be something else than the above-mentioned dimensions 76 and 150 mm, which are typical core diameters in rotogravure presses today.

By employing arrangements of the present invention in manufacturing rotogravure cores, the use range of cores having the inside diameter of 76 mm can be safely extended towards rotogravure presses, which are faster and wider than today. Thus, the arrangements according to the present invention provide answers to the challenges brought by completely new rotogravure presses as well as improve the economy of existing rotogravure presses.

Press drying (e.g. Condebelt) materials mentioned above may also be used together with conventional core boards to provide a multigrade construction in situations where the elasticity modulus need not be quite as high and where it is desirable to save material due to either limited availability or costs. In such cases, a structural ply having a high elasticity modulus is used, e.g., in places where strength is a strategic factor, and conventional, prior art structural plies of adequate competence are used elsewhere.

The stiffness of a spirally wound multigrade paperboard core may be improved by constructing the core so that at least one of the structural plies is in accordance with the present invention, having the cross machine direction elasticity modulus of at least 4500 MPa. Further, it is especially advantageous that the machine direction elasticity modulus of the structural ply is at least 7500 MPa. Preferably, the share of structural plies in accordance with the invention is at least about ⅕ of the core wall thickness. Other potential structural plies may comply with prior art. As the structural plies of a paperboard core, in accordance with the invention, are superior to structural plies of prior art, it is worthwhile optimizing the share of the former of the core wall thickness as well as their location in the core wall. As discussed above, the quality class of core raw materials and consequently also the quality class of finished cores usually goes hand in hand with the price paid/received for them. Therefore, the optimization is well grounded both from the core manufacturer's and the customer's point of view.

Preferably, paperboard core is a thick-walled paper industry core, the wall thickness H thereof being at least 10 mm and th einsdie diameter over 70 mm, such cores being used with unwinding and winding speeds of at least about 200 m/min (=3.3 m/s), the width of the paperboard ply located in the middle the core being with cores having the inside diameter of 73 mm to 110 mm, at least 185 mm, preferably over 210 mm, and more preferably over 230 mm, with cores having the inside diameter of 111 mm to 144 mm, at least 205 mm, preferably over 210 mm, and more preferably over 230 mm, with cores having th einsdie diameter of 145 mm to 180 mm, at least 210 mm, preferably over 250 mm, and more preferably 350 mm to 450 mm, and with cores having the inside diameter of 181 mm to 310 mm, at least 220 mm, preferably over 250 mm, and more preferably 350 to 500 mm, but at most the maximum ply width $L_{max}=(\pi)\times$(core diameter in the specific point).

A structural ply in accordance with the invention, a paperboard core made thereof, and a method of improving the stiffness of the paperboard core are described in greater detail in the following, by way of example, with reference to the accompanying drawings.

DETAILED DESCRIPTION OF THE DRAWINGS

Figure 1:
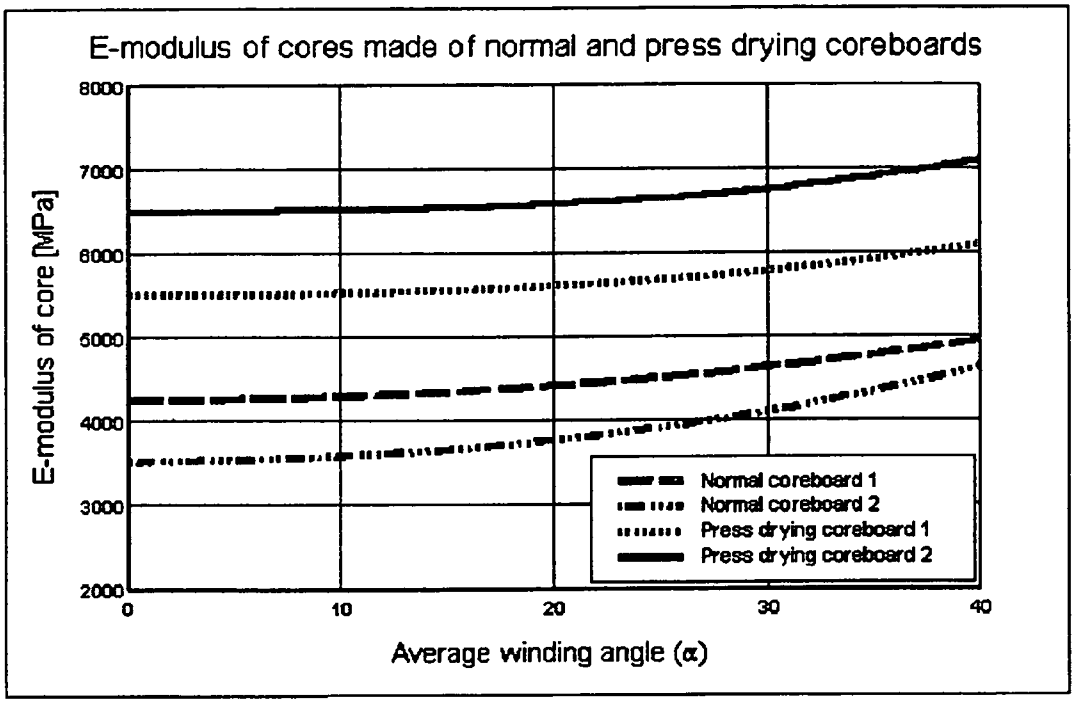
FIG. 1 shows graphically, as a function of the winding angle α, elasticity modulus values for paperboard cores made up of different paperboard plies.
Figure 2:
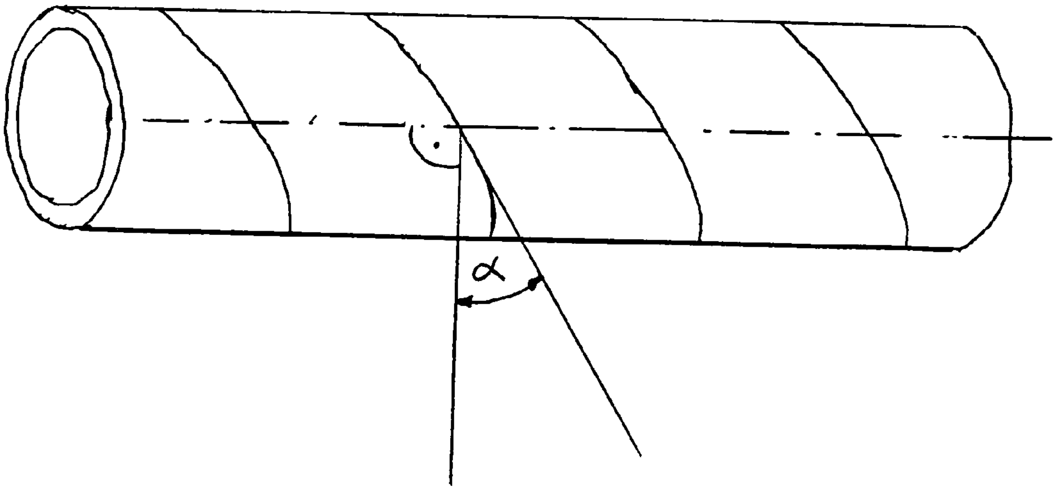
FIG. 2 illustrates the definition of the winding angle α.

FIG. 1 enclosed is a graphical illustration, presented as a function of a winding angle a (average winding angle), of elasticity modulus values of cores manufactured by using paperboard plies in accordance with the present invention, such cores being, e.g., rotogravure cores, used in the paper, film, and textile industries, said elasticity modulus values being compared with corresponding elasticity modulus values of prior art conventional cores of the higher strength class. As discussed above, with the winding angles of about 15–35°, which are usually used in spiral cores, the cross machine direction elasticity modulus is of highly essential effect on the total elasticity modulus of a finished spiral core. The definition of the winding angle $\alpha$ (average winding angle) of a paperboard ply, in connection with the present invention, is set forth in FIG. 2. The winding angle $\alpha$ (average winding angle) refers to the acute angle a between the direction transverse to the paperboard core axis and the edge of the paperboard ply. In FIG. 1, the three-point dashed line refers to a typical prior art rotogravure core of the lower strength class. The uniform dashed line again refers to a typical prior art rotogravure core of the higher strength class. In this core, the paperboard used as core material is as square as possible with regard to its orientation ratio, i.e., the numeric value of the orientation ratio is small. The dotted and dashed line refers to a rotogravure core constructed of structural plies of the invention and the solid line to another rotogravure core made up of structural plies of the invention.

When reeling thin films or yarns around a spirally wound paperboard core, the material to be reeled causes a radial compression stress on the core, the inside diameter of the core becoming subject to the compression which provides a deformation therein, i.e., a decrease in the inside diameter of the core. In practical situations, this causes problems with certain types of winding chucks, when the core tends to stick thereto.

When reeling yarns around a spirally wound paperboard core or a yarn carrier, the reeling environment may still be wet, in practice. This adds to the tendency of the inside dimensions of the core to deform and the core to stick to the winding center.

Figure 3:
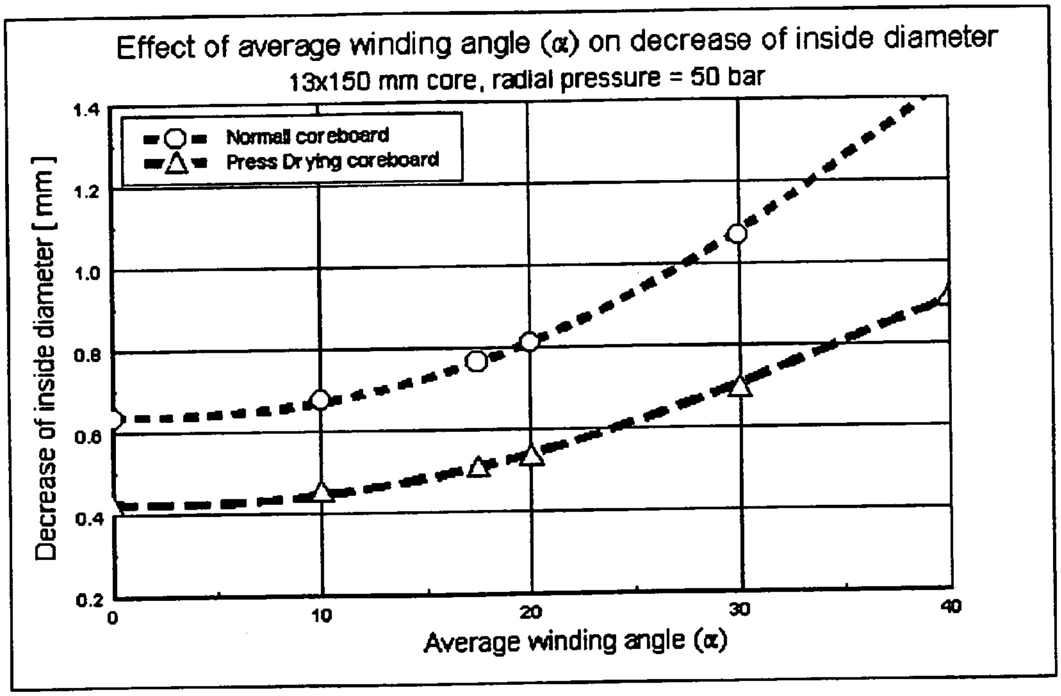
FIG. 3 illustrates the decreases in the inside diameter of a core, calculated with different winding angles a for two different types of paperboard.

We have discovered that it is possible to considerably weaken the tendency of the inside diameter of the core to decrease, by using structural plies according to the invention in constructing such cores, as can be seen from the accompanying FIG. 3.

FIG. 3 shows the decreases of the inside diameter of the core, calculated for two different paperboard grades by using different winding angles $\alpha$ (average winding angle). The orientation ratio of the paperboard commonly used today, which paperboard is marked with a circle, was about 1.6 in the test. The machine direction (MD) elasticity modulus was about 7000 MPa and the cross machine direction (CD) elasticity modulus about 3000 MPa. The orientation ratio of the paperboard manufactured by press drying (e.g. Condebelt paperboard), which paperboard is marked with a triangle, was about 1.8 in the test, and the machine direction (MD) elasticity modulus was about 11000 MPa, and the cross machine direction (CD) elasticity modulus about 6000 MPa.

What is claimed is:

1. A spirally wound paperboard core comprising a plurality of structural plies made of paperboard manufactured by a press-drying process under simultaneous application of heat and pressure, at least one said structural ply having a machine direction modulus of elasticity of at least 7500 MPa, and a cross machine direction modulus of elasticity greater than 4500 MPa, and wherein said at least one structural ply exhibits a squareness of less than 2.40, wherein the squareness is a ratio between the machine direction modulus of elasticity and the cross machine direction modulus of elasticity.

2. A paperboard core as recited in claim 1 wherein said at least one structural ply has a modulus of elasticity in the cross machine direction of greater than 5000 MPa.

3. A paperboard core as recited in claim 2 wherein said at least one structural ply has a modulus of elasticity in the machine direction of greater than 8000 MPa.

4. A paperboard core as recited in claim 3 wherein said paperboard core has a wall thickness of at least 10 mm, and an inside diameter of at 70 mm; and wherein said core has a paperboard ply located in the middle thereof, said middle paperboard ply having a width selected from the group consisting essentially of: if the core inside diameter is between 73–110 mm, at least 185 mm; if the core inside diameter is between 111–144 mm, at least 205 mm; if the core inside diameter is between 145–180 mm, at least 210 mm; and if the core inside diameter is between 181–310 mm, at least 220 mm; except that the maximum ply width is ($\pi$ times the core diameter.

5. A paperboard core as recited in claim 1 wherein said at least one structural ply has a modulus of elasticity in the cross machine direction of greater than 6500 MPa, and wherein said at least one structural ply has a modulus of elasticity in the machine direction of greater than 8000 MPa.

6. A paperboard core as recited in claim 5 wherein said paperboard core has a wall thickness of at least 10 mm, and an inside diameter of at 70 mm; and wherein said core has a paperboard ply located in the middle thereof, said middle paperboard ply having a width selected from the group consisting essentially of: if the core inside diameter is between 73–110 mm, at least 230 mm; if the core inside diameter is between 111–144 mm, at least 230 mm; if the core inside diameter is between 145–180 mm, about 350–450 mm; and if the core inside diameter is between 181–310 mm, about 350–500 mm; except that the maximum ply width is ($\pi$ times the core diameter.

* * * * *